US007864796B1

(12) United States Patent
Benveniste

(10) Patent No.: US 7,864,796 B1
(45) Date of Patent: Jan. 4, 2011

(54) START-TO-FINISH RESERVATIONS IN DISTRIBUTED MAC PROTOCOLS FOR WIRELESS LANS

(75) Inventor: Mathilde Benveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 628 days.

(21) Appl. No.: 11/397,337

(22) Filed: Apr. 4, 2006

Related U.S. Application Data

(60) Provisional application No. 60/667,670, filed on Apr. 4, 2005.

(51) Int. Cl.
*H04J 3/02* (2006.01)
*H04J 3/14* (2006.01)
*G08C 15/00* (2006.01)
*H04L 12/26* (2006.01)

(52) U.S. Cl. ............... 370/462; 370/230; 370/395.2
(58) Field of Classification Search ............... 370/338, 370/431, 230, 329; 455/69, 450, 509
See application file for complete search history.

(56) References Cited

U.S. PATENT DOCUMENTS

2005/0002355 A1* 1/2005 Takano .................. 370/329
2005/0052995 A1* 3/2005 Gu et al. ................ 370/230
2005/0063408 A1* 3/2005 Famolari ................ 370/431
2006/0153152 A1* 7/2006 Kondylis et al. .......... 370/338
2006/0153156 A1* 7/2006 Wentink et al. .......... 370/338
2006/0165036 A1* 7/2006 Chandra et al. .......... 370/329
2008/0232335 A1* 9/2008 Del Prado Pavon et al. . 370/338

* cited by examiner

*Primary Examiner*—Nick Corsaro
*Assistant Examiner*—Tangela T. Chambers
(74) *Attorney, Agent, or Firm*—Chapin IP Law, LLC; David W. Rouille, Esq.

(57) ABSTRACT

A method, apparatus and computer program product for providing start-to-finish reservations in distributed MAC protocols for wireless LANs. Each node maintains a corresponding time period (NAV) during which the node must refrain from transmitting on a channel of a plurality of traffic channels. Each NAV is set by detecting a reservation request (RRQ) or a reservation response (RRS), each corresponding NAV comprising the larger of a RRQ NAV value and a RRS NAV value. Each node declines to reserve a traffic channel while the NAV is non-zero, and declines to transmit on a channel when the node detects the occurrence of a transmission on the channel or that the NAV is non-zero. The RRQ NAV is reset while a corresponding RRS NAV is decremented when a reservation is cancelled, and the RRS NAV is reset while a corresponding RRQ NAV is decremented when the reservation time period expires.

12 Claims, 3 Drawing Sheets

START-TO-FINISH RESERVATIONS IN DISTRIBUTED MAC PROTOCOLS FOR WIRELESS LANS

CROSS REFERENCE TO RELATED APPLICATIONS

The present application claims the benefit of U.S. Provisional Patent Application No. 60/667,670, filed on Apr. 4, 2005, which is incorporated herein by reference.

BACKGROUND

Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points. Previous work has focused on increasing link throughput. This is necessary for single-stream high throughput applications. While it helps increase aggregate throughput, it is not the only way to do so. A Media Access Control (MAC)-based approach that enables the parallel use of multiple channels in a BSS, or a wireless mesh, can increase aggregate throughput. The CCC (Common Control Channel) MAC protocol utilizes two types of logical channels, the control channel and the data channels.

In wireless Local Area Networks (LANS), a wireless channel can be reserved for the transmission of a sequence of frames while employing asynchronous distributed random channel access methods. In such an environment, both the source and destination of the transmission broadcast the reservation duration in order to establish the interference neighborhood.

One method of performing reservation in wireless LANs is by utilizing Frame-by-frame reservation. According to the 802.11 distributed channel access MAC protocol, RTS/CTS frames are used to notify neighbors of the start of the reservation. The reservation time is extended on a frame-by-frame basis, by updating the duration of the reservation with each data frame and the acknowledgement that follows. A consequence of frame-by-frame reservation if that, if the reservation is denied, it does not require cancellation.

Another method of performing reservation in wireless LANS is by utilizing Start-to-finish reservation. If it is not be possible to extend the time of channel reservation on a frame-by-frame basis, the channel must be reserved for the entire sequence of transmissions, start to finish, at the time of the reservation request, and, if the reservation request is denied, or if time remains reserved at the completion of transmission, the reservation must be cancelled.

A start-to-finish reservation applies to any combination of nodes (i.e. mesh points/APs/stations). A node reserves a channel to cover an entire sequence of transmissions, directed to either one or various different destinations, possibly including responses from the destinations. If the reservation is not authorized, or when the transmission sequence is completed, the reserving node releases the remaining reservation time by canceling the reservation.

An example of this is given using a Mesh Coordination Function (MCF) example comprising a mesh network with multiple channels. Reservations for time on one of multiple channels occur asynchronously by an exchange of frames on the control channel. All mesh points monitor the same channel—called the "control" channel. Because the control channel is different from the "traffic" channel (the channel of the data transmission) it is not possible to extend a reservation on a frame-by-frame basis. The traffic channel is thus reserved for the total time needed to transmit the data frames.

Another example is given using an 802.11e hybrid polled and distributed access 802.11e systems. When a polling cycle is started by a Hybrid Controller (HC, also referred to as an Access Point), it reserves the channel for the entire duration of the service period A NAV is defined as a time period a node must refrain from transmitting on a traffic channel. A reservation request from the source is either granted or denied by the destination, and notice is sent to the source. The response contains the remaining reservation duration in order to notify the neighbors of the destination node. To avoid collisions, each node keeps a NAV for each traffic channel which is set according to the received reservation requests and responses. The NAV is the time period the node must refrain from transmitting on the channel, and is updated when a node receives a reservation request or a response to the reservation request.

SUMMARY

Conventional mechanisms such as those explained above suffer from a variety of deficiencies. One such deficiency is resetting the NAV in start-to-end reservations. When the time remaining on a start-to-end reservation is cancelled, the NAV request must also be cancelled. To cancel a reservation, the source node requests resetting of the NAV. A collision may be caused if there are other outstanding NAV setting requests.

The NAV of a node may have been set as a result of two types of requests—a reservation request (RRQ—e.g. RTS, MRTS) or a reservation response (RRS—e.g. CTS, MCTS). Resetting the NAV will not cause a node to transmit if there are any outstanding RRQ NAV setting requests. A node receiving a NAV reset request will transmit only if the channel is idle. A node would hear the transmission if its NAV was set based on the RRQ. Resetting the NAV may cause a node to transmit and collide if there are outstanding RRS NAV setting requests. A node will not hear the transmission if it received only a RRS (but no RRQ). Resetting the NAV will cause a collision only if there are no outstanding RRQ NAV setting requests and at least one outstanding RRS NAV setting request Embodiments of the invention significantly overcome such deficiencies and provide mechanisms and techniques that provide a start-to-finish reservations in distributed MAC protocols for wireless LANS.

In a particular embodiment of a method for providing start-to-finish reservations in distributed MAC protocols for wireless LANs, the method includes maintaining at each respective node of a wireless LAN, a corresponding time period (NAV) during which the respective node must refrain from transmitting on a channel of a plurality of traffic channels, wherein each corresponding NAV is set by detecting a request selected from the group consisting of a reservation request (RRQ) and a reservation response (RRS), and wherein each the corresponding NAV comprises the larger of a RRQ NAV value and a RRS NAV value. The method further includes declining, at each respective node, to reserve a traffic channel while the corresponding NAV is non-zero and declining, at each the node, to transmit on a channel when the each node detects at least one of the group consisting of the occurrence of a transmission on the channel and the NAV is non-zero. The method additionally includes at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires.

Other embodiments include a computer readable medium having computer readable code thereon for providing start-to-finish reservations in distributed MAC protocols for wireless LANs. The computer readable medium includes instructions for maintaining at each respective node of a wireless LAN, a corresponding time period (NAV) during which the respective node must refrain from transmitting on a channel of a plurality of traffic channels, wherein each the corresponding NAV is set by detecting a request selected from the group consisting of a reservation request (RRQ) and a reservation response (RRS), and wherein each the corresponding NAV comprises the larger of a RRQ NAV value and a RRS NAV value. The computer readable medium also includes instructions for declining, at each respective node, to reserve a traffic channel while the corresponding NAV is non-zero; as well as instructions for declining, at each the node, to transmit on a channel when the each node detects at least one of the group consisting of the occurrence of a transmission on the channel and the NAV is non-zero; The computer readable medium additionally includes instructions for at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides start-to-finish reservations in distributed MAC protocols for wireless LANs as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing start-to-finish reservations in distributed MAC protocols for wireless LANs as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft New Jersey.

BRIEF DESCRIPTION OF THE DRAWINGS

The foregoing will be apparent from the following more particular description of ferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
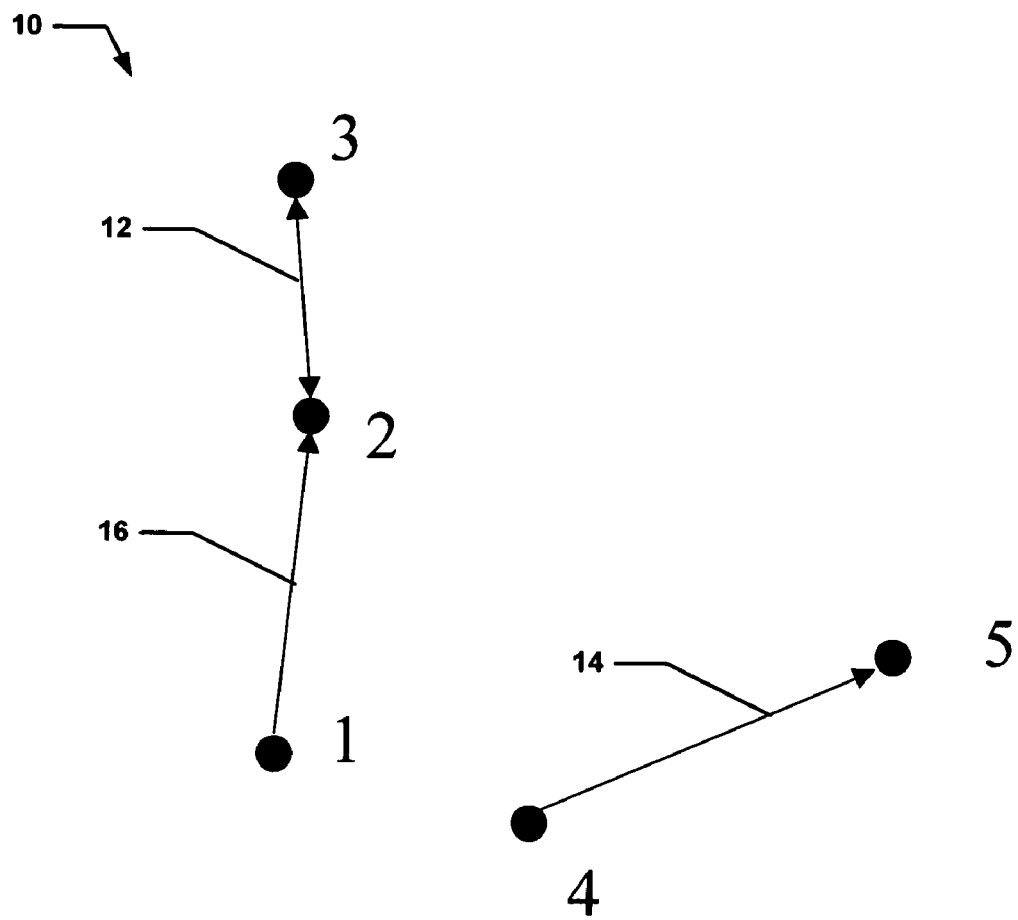
FIG. 1 is a block diagram of a wireless LAN used for performing start-to-finish reservations in distributed MAC protocols in accordance with embodiments of the invention.

Wireless LANs can use start-to-finish reservations in order to reserve a channel to cover an entire sequence of transmissions, directed to either one or various different destinations, possibly including responses from the destinations. If the reservation is not authorized, or when the transmission sequence is completed, the reserving node releases the remaining reservation time by canceling the reservation. Reservations for time on one of multiple channels occur asynchronously by an exchange of frames on the control channel. All mesh points monitor the same channel—called the "control" channel. Because the control channel is different from the "traffic" channel, the channel of the data transmission, it is not possible to extend a reservation on a frame-by-frame basis. The traffic channel is thus reserved for the total time needed to transmit the data frames A reservation request from the source is either granted or denied by the destination, and notice is sent to the source. The response contains the remaining reservation duration in order to notify the neighbors of the destination node. To avoid collisions, each node keeps a NAV for each traffic channel which set according to the received reservation requests and responses. The NAV is the time period the node must refrain from transmitting on the channel. The NAV is updated when a node receives a reservation request or a response to the reservation request.

By way of the present invention, each node keeps for each traffic channel a NAV which is the greater of two NAV components: a RRQ_NAV and a RRS_NAV. The RRQ_NAV is overwritten by the Duration field value of a RRQ received from another MP if this value is greater than the current RRQ_NAV. The RRS_NAV is overwritten by the Duration field value in a RRS if this value is greater than the current RRS_NAV. When the source MP resets the NAV, only the RRQ_NAV is reset, the RRS NAV is not reset. A node will refrain from reserving the channel and transmitting if its NAV is non-zero. As a result, there will be no collisions when the NAV is reset. The node will transmit only if there are neither RRQ_NAV requests nor RRS_NAV requests outstanding. If there are outstanding RRQ_NAV requests, the node will not transmit because it hears the transmission. If there are outstanding RRS_NAV requests, the node will not transmit because the RRS NAV was not reset.

In MCF environments, if the destination node declines a reservation request, the destination node does not update its NAV and sends a MCTS notifying the source node of the denial. When receiving notice of reservation denial, the source node resets the NAV. The source node sends a MRTS with a Duration field value set to 0 in order to reset NAVs. There are two types of NAV setting requests: a RRQ (a MRTS), and a RRS (a MCTS).

For the MCF environment, each node keeps for each traffic channel a NAV which is the greater of two NAV components: a MRTS_NAV which is set to the Duration field value of a MRTS received by the node for the channel in question if this, value is greater than the current MRTS_NAV for the channel in question or is set to 0 if the Duration field value in a MRTS received by the node for the channel in question is 0, and a MCTS_NAV which is set to the Duration field value in a MCTS received by the node for the channel in question if this value is greater than the current MCTS_NAV for the channel in question. A node will not attempt to reserve a channel if its NAV is non-zero. A node will refrain from transmitting on a channel if it hears transmissions on the channel. As a result, there will be no collisions when the NAV is reset. If there are outstanding MRTS_NAV requests, the node will not transmit because it hears the transmission. If there are outstanding MCTS_NAV requests, the node will not attempt a reservation because the MCTS_NAV was not reset. The node will transmit only if there are neither MRTS_NAV requests nor MCTS_NAV requests outstanding For an 802.11e environment, when completing a polling cycle, the HC resets the NAV. The HC can reset the NAV of its stations by sending CF-END. The HC can reset the NAV of its stations by sending QoS (+)CF-poll to itself with duration set to 0. There are two types of NAV setting requests, a RRQ which is a RTS or a data frame from another station or a poll to a station in the BSS, and a RRS which is a CTS or an acknowledgement from another station. If a station transmits when the HC resets NAVs, there can be a collision with transmissions in adjacent BSSs. To be permitted to reset its NAV, a station keeps a NAV that is the greater of two NAV components. The first component is a RTS_NAV which is set to the Duration field value of a poll, RTS, or data frame received by the station, if this value is greater than the current MRTS_NAV; or is set to 0 if it receives from its serving HC. a QoS (+)CF-poll with Duration value set to 0, or a CF-END. The second component is a CTS_NAV which is set to the Duration field value in a CTS or acknowledgement received by the station, if this value is greater than the current CTS_NAV. A station will refrain from transmitting if its NAV is non-zero or if it hears transmissions on the channel. The result is the same as described earlier. In this case, the HC is the only station allowed to reset the RTS_NAV of its own stations only. There will be no collisions when the NAV is reset. The station will transmit only if there are neither RTS_NAV requests nor CTS_NAV requests outstanding. If there are outstanding RTS_NAV requests, the station will not transmit because it hears the transmission. If there are outstanding MCTS_NAV requests, the station will not attempt a transmission because the CTS_NAV was not reset.

In an isolated BSS (no OBSS), where stations can only communicate with the AP but not among themselves, there is no collision problem when resetting the NAV. OBSS and ad hoc networks (e.g. meshes) may experience collisions when the NAV is reset. In order to avoid collisions caused by NAV resetting a station remembers whether the duration indicated on a CTS has not expired. This is referred to as having a CTS that is 'pending'. A flag CTS_PENDING is incremented when a new CTS arrives with non-zero Duration field. The flag is cleared when the NAV expires or is reset. A station will reset its NAV, if the channel is idle for specified time interval, the flag CTS_PENDING is clear, and its NAV was last updated by a RTS. If the flag CTS_PENDING is set, the station does not reset the NAV.

Referring now to FIG. 1, a first wireless LAN environment 10 is shown. In this environment, five nodes (numbered one through five) are shown. In this environment 10, a RTS0/CTS0 (12) is sent between node 2 and node 3. As a result the NAV at node 1 is set to a value. Next, RTS1 (14) is sent between node 4 and node 5. Following this, the RTS1 (14) reservation is cancelled. This cancellation causes the NAV at node 1 to be reset. Next, RTS2 (16) is sent between node 1 and node 2, resulting in a collision at node 2.

The same environment 10 implementing the present method of providing start-to-finish reservations in distributed MAC protocols for wireless LANs which avoid collisions will now be discussed. In this environment 10, a RTS0/CTS0 (12) is sent between node 2 and node 3. As a result the NAV at node 1 is set to a value and a CTS-Pending flag is set. Next, RTS1 (14) is sent between node 4 and node 5, updating the NAV at node 1. Following this, the RTS1 (14) reservation is cancelled. This however, does not cause the NAV at node 1 to be reset because CTS-PENDING is set. As a result RTS2 (16) is not sent between node 1 and node 2, avoiding a collision at node 2.

Figure 2:
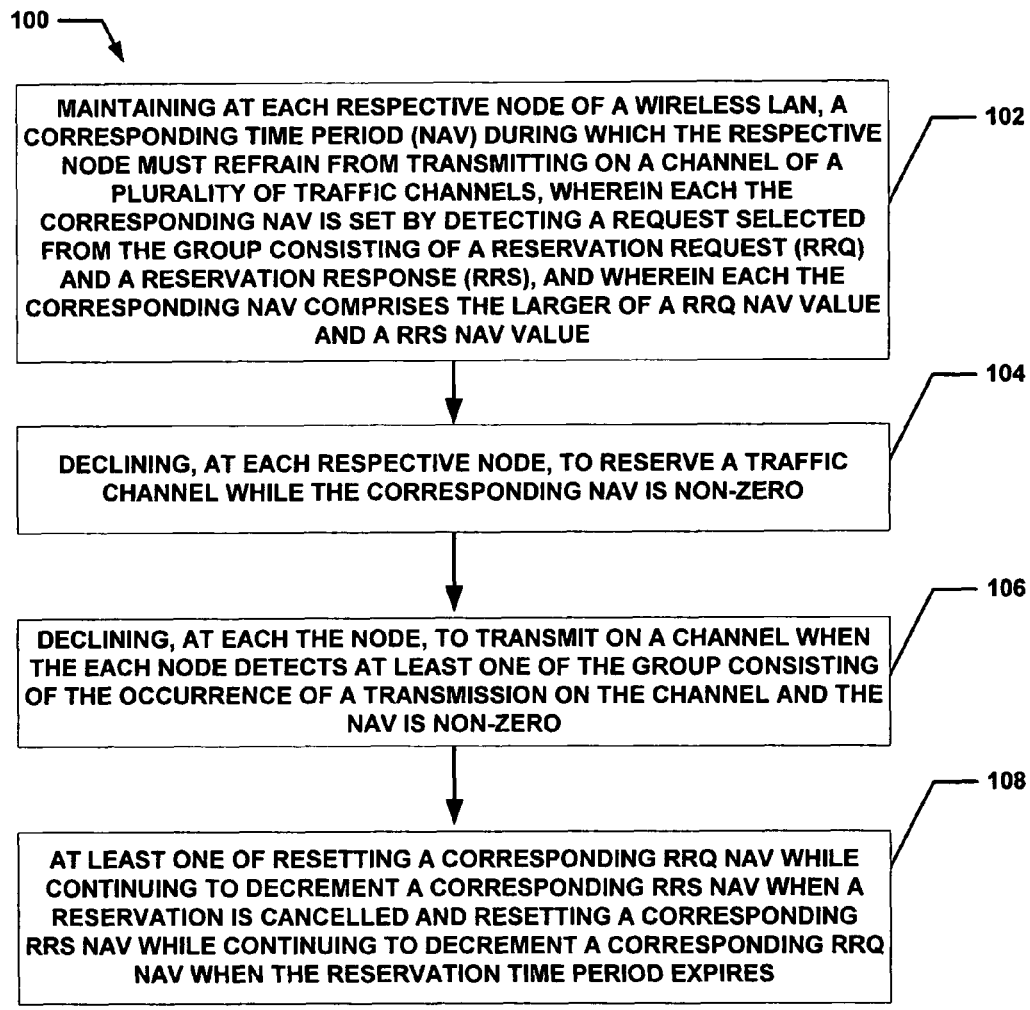
FIG. 2 is a block diagram of a particular embodiment of a method of performing start-to-finish reservations in distributed MAC protocols for wireless LANs in accordance with embodiments of the invention.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2, a particular embodiment of a method 100 of providing start-to-finish reservations in distributed MAC protocols for wireless LANs is shown. The method begins with processing block 102 which discloses maintaining at each respective node of a wireless LAN, a corresponding time period (NAV) during which the respective node must refrain from transmitting on a channel of a plurality of traffic channels, wherein each said corresponding NAV is set by detecting a request selected from the group consisting of a reservation request (RRQ) and a reservation response (RRS), and wherein each said corresponding NAV comprises the larger of a RRQ NAV value and a RRS NAV value.

The method 100 continues with processing block 104 states declining, at each respective node, to reserve a traffic channel while the corresponding NAV is non-zero.

Processing block 106 recites declining, at each said node, to transmit on a channel when said each node detects at least one of the group consisting of the occurrence of a transmission on the channel and said NAV is non-zero.

Processing block 108 discloses at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires.

Figure 3:
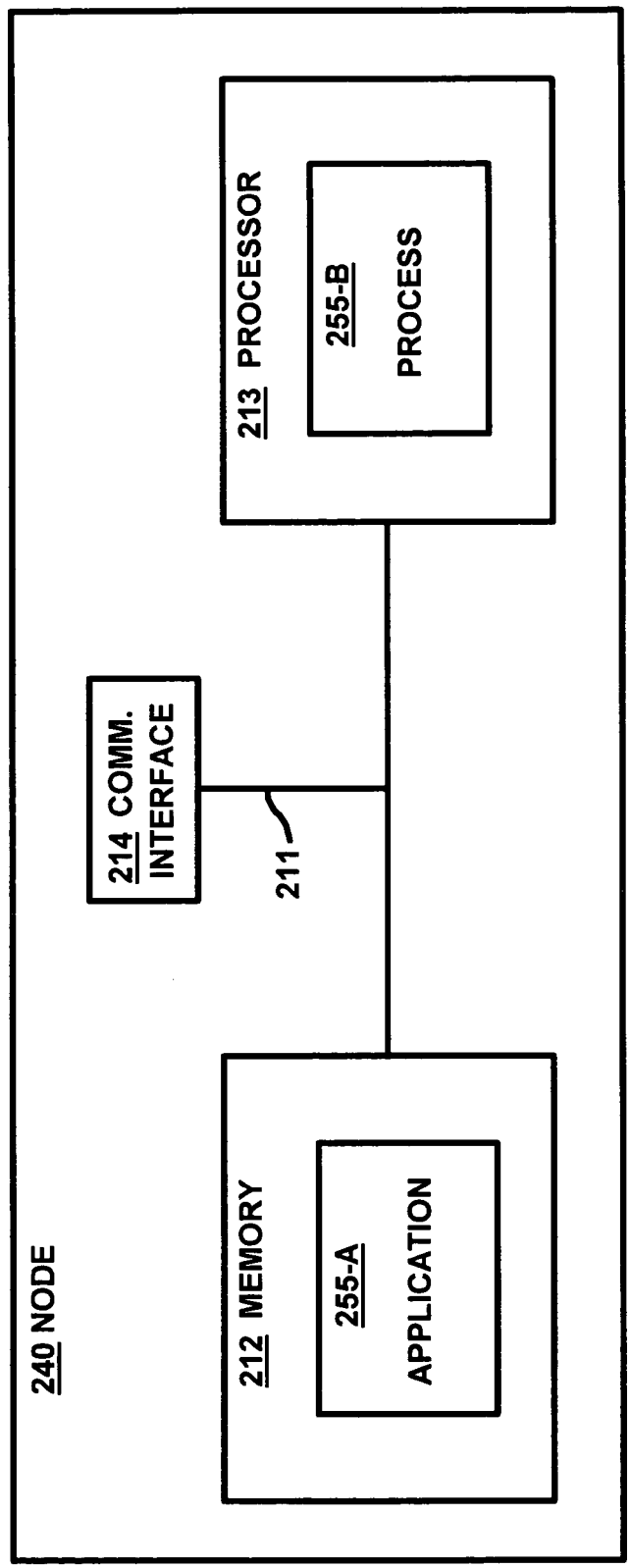
FIG. 3 illustrates an example architecture for a node that performs start-to-finish reservations in distributed MAC protocols for wireless LANs in accordance with embodiments of the invention.

FIG. 3 illustrates example architectures of a computer system that is configured as a node 240. The node 240 includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the node in order to produce a corresponding process 255-B. In other words, the process 255-B represents one or more portions of the application 255-A performing within or upon the processor 213 in then node.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the node may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   maintaining at each respective node of a wireless Local Area Network (LAN), two corresponding time periods (NAVs) during which the respective node must refrain from transmitting on a channel of a plurality of traffic channels, wherein each said corresponding NAV is set by detecting a request selected from the group consisting of a reservation request (RRQ) and a reservation response (RRS), and wherein each said corresponding NAV comprises the larger of a RRQ NAV value and a RRS NAV value;
   declining, at each respective node, to reserve a traffic channel while the corresponding NAV is non-zero;
   declining, at each said node, to transmit on a channel when said each node detects at least one of the group consisting of the occurrence of a transmission on the channel and said NAV is non-zero; and
   at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires, and wherein said RRQ NAV is overwritten by a Duration field of a RRQ received from another mesh point when said the value of said Duration field is greater than a current value of said RRQ NAV and wherein said RRS NAV is overwritten by a Duration field of a RRS when said the value of said Duration field is greater than a current value of said RRS NAV.

2. The method of claim 1 wherein when a source mesh point resets said NAV, said RRQ NAV is also reset.

3. The method of claim 2 wherein when a source mesh point resets said NAV, said RRS NAV is not reset.

4. The method of claim 3 wherein said node will only transmit when there are neither RRQ NAV requests nor RRS NAV requests outstanding.

5. A computer readable storage medium having computer readable code thereon for providing start-to-finish reservations in distributed Media Access Control (MAC) protocols for wireless local area networks (WLANs), the medium including instructions in which a computer system performs operations comprising:
   maintaining at each respective node of a wireless Local Area Network (LAN), two corresponding time periods (NAVs) during which the respective node must refrain from transmitting on a channel of a plurality of traffic channels, wherein each said corresponding NAV is set by detecting a request selected from the group consisting of a reservation request (RRQ) and a reservation response (RRS), and wherein each said corresponding NAV comprises the larger of a RRQ NAV value and a RRS NAV value;
   declining, at each respective node, to reserve a traffic channel while the corresponding NAV is non-zero;
   declining, at each said node, to transmit on a channel when said each node detects at least one of the group consisting of the occurrence of a transmission on the channel and said NAV is non-zero; and
   at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires, and wherein said RRQ NAV is overwritten by a Duration field of a RRQ received from another mesh point when said the value of said Duration field is greater than a current value of said RRQ NAV and wherein said RRS NAV is overwritten by a Duration field of a RRS when said the value of said Duration field is greater than a current value of said RRS NAV.

6. The computer readable storage medium of claim 5 wherein when a source mesh point resets said NAV, said RRQ NAV is also reset.

7. The computer readable storage medium of claim 6 wherein when a source mesh point resets said NAV, said RRS NAV is not reset.

8. The computer readable storage medium of claim 7 wherein said node will only transmit when there are neither RRQ NAV requests nor RRS NAV requests outstanding.

9. A computer system comprising:
a memory;
a processor;
a communications interface;
an interconnection mechanism coupling the memory, the processor and the communications interface; and
wherein the memory is encoded with an application providing start-to-finish reservations in distributed Media Access Control (MAC) protocols for wireless local area networks (WLANs), that when performed on the processor, provides a process for processing information, the process causing the computer system to perform the operations of:
maintaining at each respective node of a wireless Local Area Network (LAN), two corresponding time periods (NAVs) during which the respective node must refrain from transmitting on a channel of a plurality of traffic channels, wherein each said corresponding NAV is set by detecting a request selected from the group consisting of a reservation request (RRQ) and a reservation response (RRS), and wherein each said corresponding NAV comprises the larger of a RRQ NAV value and a RRS NAV value;
declining, at each respective node, to reserve a traffic channel while the corresponding NAV is non-zero;
declining, at each said node, to transmit on a channel when said each node detects at least one of the group consisting of the occurrence of a transmission on the channel and said NAV is non-zero; and
at least one of resetting a corresponding RRQ NAV while continuing to decrement a corresponding RRS NAV when a reservation is cancelled and resetting a corresponding RRS NAV while continuing to decrement a corresponding RRQ NAV when the reservation time period expires, and wherein said RRQ NAV is overwritten by a Duration field of a RRQ received from another mesh point when said the value of said Duration field is greater than a current value of said RRQ NAV and wherein said RRS NAV is overwritten by a Duration field of a RRS when said the value of said Duration field is greater than a current value of said RRS NAV.

10. The computer system of claim 9 wherein when a source mesh point resets said NAV, said RRQ NAV is also reset.

11. The computer system of claim 10 wherein when a source mesh point resets said NAV, said RRS NAV is not reset.

12. The computer system of claim 11 wherein said node will only transmit when there are neither RRQ NAV requests nor RRS NAV requests outstanding.

* * * * *